United States Patent [19]
Martin

[11] Patent Number: 4,959,924
[45] Date of Patent: Oct. 2, 1990

[54] INSECT BAIT STATION
[75] Inventor: John Martin, Racine County, Wis.
[73] Assignee: S. C. Johnson & Son, Inc., Racine, Wis.
[21] Appl. No.: 333,707
[22] Filed: Apr. 5, 1989
[51] Int. Cl.$^5$ ............................................. A01M 1/14
[52] U.S. Cl. ..................................... 43/114; 43/132.1
[58] Field of Search ................ 43/114, 132.1, 131, 43/107, 121

[56] References Cited
U.S. PATENT DOCUMENTS 2,911,756 11/1959 Geary .
3,972,993 8/1976 Kobayaski et al. ................... 43/124
4,044,495 8/1977 Nishimura et al. .................... 43/114
4,193,984 3/1980 Kydonieus ............................. 43/124
4,425,731 1/1984 Orlando ................................. 43/114
4,577,434 3/1986 Davis ...................................... 43/115
4,666,767 5/1987 VonKohorn et al. ............... 43/132.1
4,866,877 9/1989 Barak .................................. 43/132.1

Primary Examiner—Richard K. Seidel
Assistant Examiner—James Miner

[57] ABSTRACT

A device for killing flying insects, which can be fabricated from a single blank, for holding an insect-attracting bait behind a grille structure, which has a tray portion for trapping and retaining insects, and which can be folded up like an envelope for shipping and sale.

14 Claims, 2 Drawing Sheets

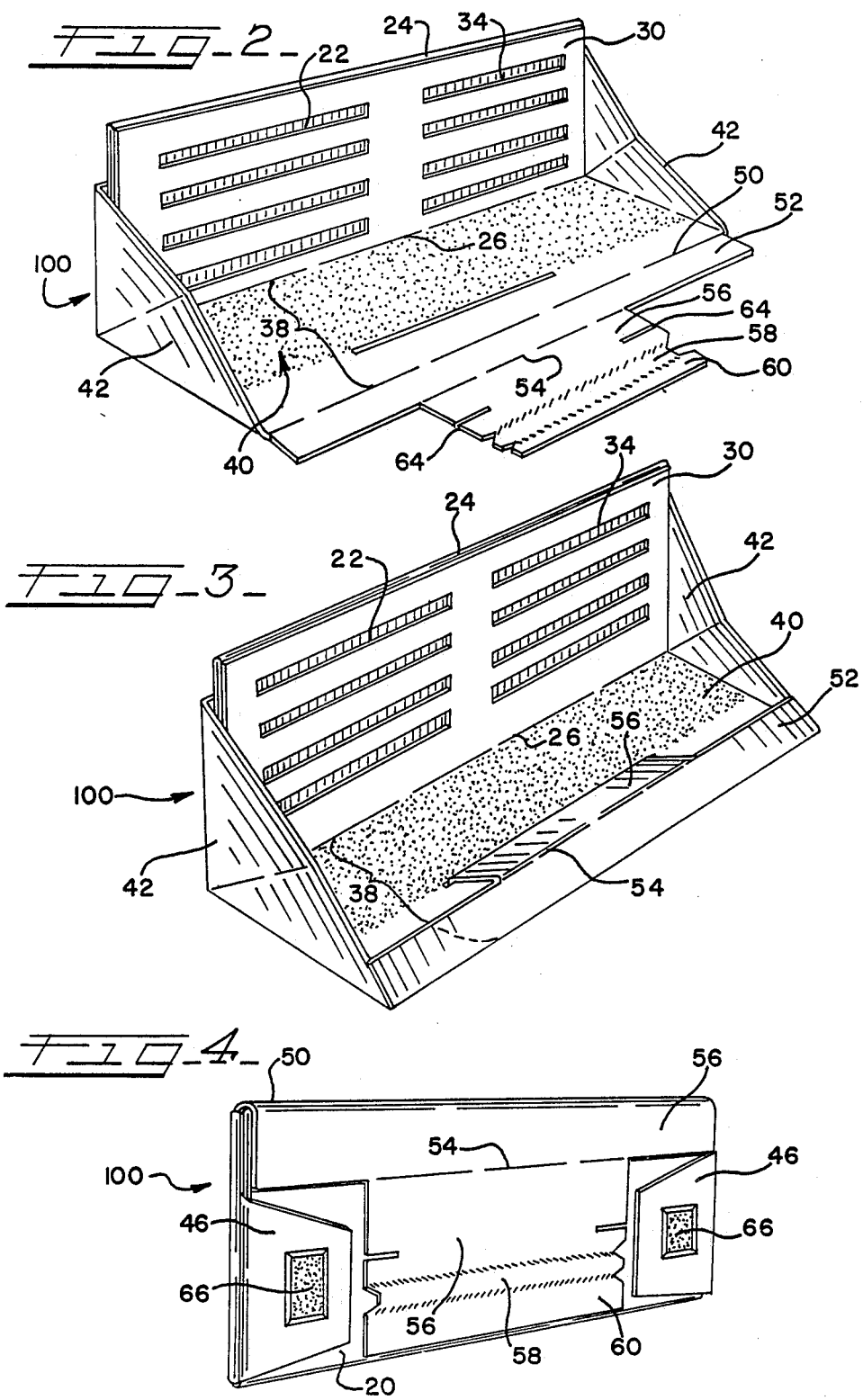

INSECT BAIT STATION

FIELD OF INVENTION

This invention relates to the field of insect control and particularly to a simple device, assembled from a single blank, for killing flying insects, which has an insect-attracting bait behind a grille-like cover and an adhesive-coated hinged tray which folds down to trap and retain insects, and which can be folded up for shipping and sale, and unfolded for consumer use.

BACKGROUND OF INVENTION

Many passive methods of killing flying insects have been used in the past. One of the oldest is the use of flypapers, to which flying insects are attracted and upon which they become trapped. A fairly recent method of using flypaper is shown in U.S. Pat. No. 2,911,756 which discloses a flexible sheet backing with a flypaper-like or insecticidal substance on one side and, on the other side, a pressure sensitive adhesive, enabling a user to mount the sheet on a wall or other surface.

Containers for flypaper tend to be separate structures into which flypaper or other bait is placed. U.S. Pat. No. 4,577,434 is such a device—a perforated plastic outer canister into which a roll of flypaper is inserted.

U.S. Pat. No. 3,972,993 discloses an insecticidal device with a perforated cover sheet coated with an insecticidal agent over a core with an insect attractant.

Other methods of killing flying insects have involved the use of controlled release insecticide dispensers, such as the well known SHELL No Pest Strip. Many of the recent approaches to controlling insects involve the use of laminated articles which release insecticides over time. U.S. Pat. Nos. 4,666,767 and 4,193,984 are examples of this approach.

Prior art devices for killing insects thus have primarily been either very simple or fairly complicated and therefore relatively expensive to produce. The simple, flypaper strip devices have the drawback of the insect killing and trapping substances being easily accessible to animals or humans and having the dead insects either attached to the surface of the device or lying beneath it, making disposal awkward and unpleasant.

Thus, it is an object of this invention to provide a device for holding an insect-attracting bait that is simple and inexpensive, both in manufacture and in use.

It is a further object of the invention to provide such a device that limits access to the bait by children and animals, both because of its structure and its intended placement.

It is a further object of the invention to provide such a device that incorporates a means for preventing dead and dying insects from littering the surrounding area.

It is a further object of the invention to provide such a device that can be easily and neatly disposed of after it has performed its function.

SUMMARY OF THE INVENTION

The present invention presents a device—simple to use and simple and inexpensive to manufacture—for holding an insect-attracting bait. The device can be die cut and assembled from a single essentially rectangularly shaped blank of paperboard or like substance.

The central section of this blank an area extending across the width of the rectangle, is coated on one side with an insect-attracting bait. The top end of the blank above the central section is a grille-like structure with openings therethrough which is divided across its width into equal halves so it can be doubled over against itself, creating a double-thickness grille, which is itself folded over the central section, so that the insect-attracting bait is accessible though the openings in the grille. The lower end of the blank, below the central section, is formed into a tray that is hinged to be extended outward at right angles from the grille/central section assembly. The tray may be coated on its upper surface with an adhesive substance to trap and retain insects attracted to the device.

For shipment and sales, the tray portion of the device can be folded flat against the central section in an envelope like flap which is folded over the back of the unit. After use, the tray section can be refolded against the central section for disposal. A peelable cover sheet. which must be removed prior to use, may be inserted between the grille and the tray sections to prevent the adhesive on the tray from causing the two sections to stick together and to keep both the attractant and adhesive materials from possible detachment during shipment or storage under conditions such as high temperature or humidity. The flap itself can be affixed to the back of the central section with a tear strip. Adhesive patches may also be affixed to the back of the central section, so that the device may be fastened to a wall or other surface.

BRIEF DESCRIPTION OF THE DRAWINGS

FIG. 2 is a perspective view of the device opened out and partially for assembled for use.

FIG. 3 is a perspective view of the device, opened out and assembled for use.

FIG. 4 is a back view of the device as it appears when completely folded and sealed upon itself.

DESCRIPTION OF THE PREFERRED EMBODIMENT

Figure 1:
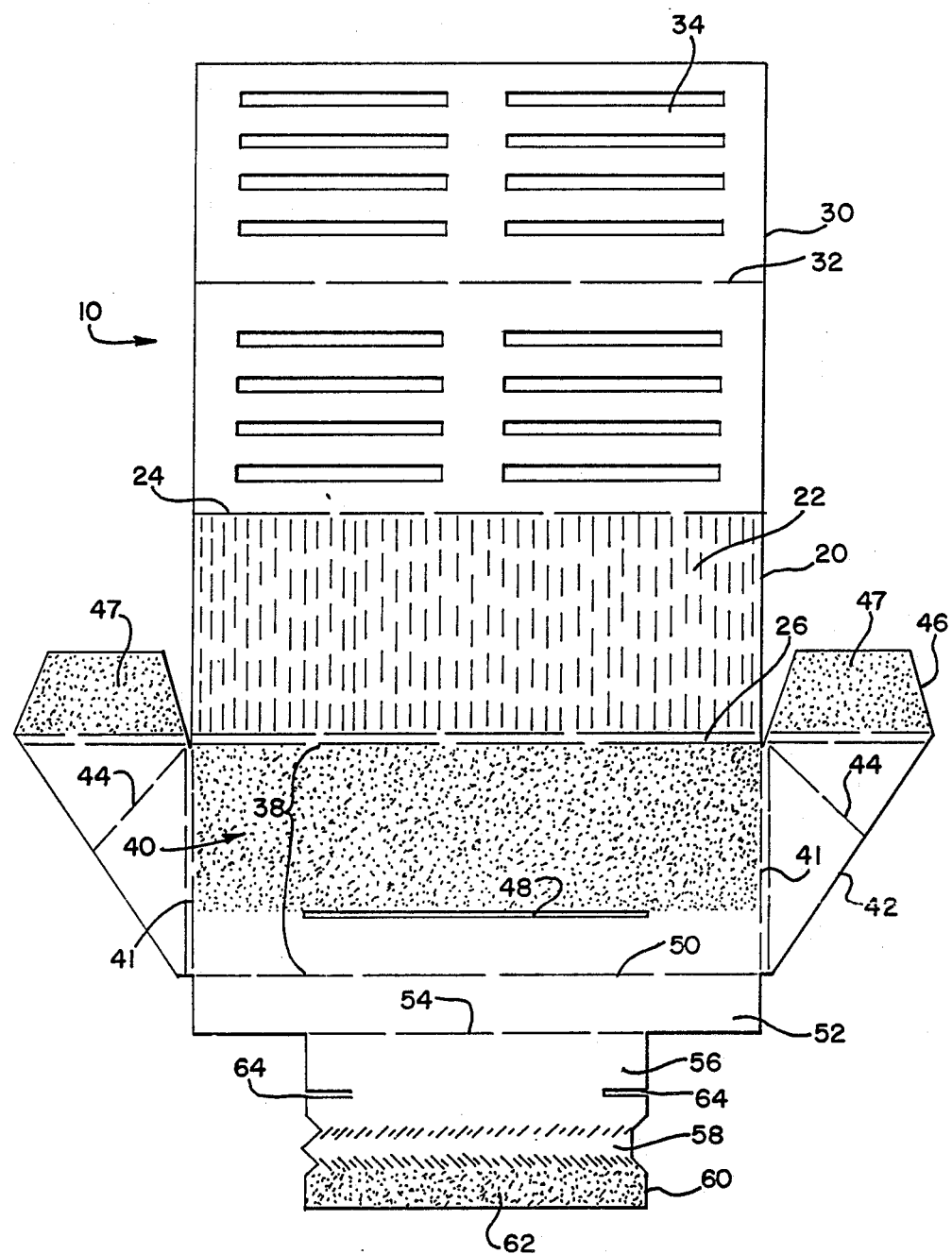
FIG. 1 is a top view of the blank for fabricating the device.

FIG. 1 shows an essentially rectangular blank 10 for fabricating a device for killing flying insects. Blank 10 has a central section 20 which is coated on one side with an insect-attracting bait 22. An insecticide can be incorporated into the bait, to add an additional means for killing insects to the invention. Central section 20 is bounded on either side by a pair of parallel fold lines 24 and 26 which may be scored, perforated, or otherwise weakened for folding. Ajoining the central section 20 on one side and separated from the central section by fold line 24 is a grille section 30 extending across the width of blank 10. Grille section 30 is bisected laterally by fold line 32 extending across the width of the blank 10. Grille section 30 has a plurality of openings 34 therethrough with the number, size and placement of said openings being identical on each side of fold line 32. Grille section 30 has on its inner face unshown areas of glue or other adhesive, so that grille section 30 may be folded in upon itself alonq fold line 32, as described more fully below, and central section 20 likewise has unshown areas of adhesive so that doubled over grille section 30 may be folded along fold line 24 against central section 20.

Ajoining central bait bearing section 20 on the opposite side from grille section 30 and separated from central section 20 by fold line 26 is tray section 38 extending across the width of blank 10. Tray section is coated upon its upper surface with a sticky adhesive substance 40 to retain the bodies of dead or dying insects. Tray section 38 has on each of its sides a roughly right angle triangle-shaped hinge flap 42 extending outwardly from blank 10, having the edge of one leg of each right triangle being parallel to fold line 26 which extends across blank 10 and the edge of the other leg adjacent to but separated from the tray section by fold line 41. Each hinge flap 42 has a central fold line 44 bisecting the right angle.

Extending upward from each hinge flap 42 and separated from hinge flap 42 by extensions of fold line 26 across blank 10 are attachment tabs 46, which have glue 47 on their top surfaces. Extending across and through tray section 38 is slot 48.

Adjoining tray section 38 and separated from tray section 38 by fold line 50 extending across the width of blank 10 is closure flap 52. Parallel to fold line 50 but separated by a space equivalent to the width of the multiply folded blank is fold line 54. Adjacent fold line 54 is closure attachment flap 56 which has tear strip 58 across its width and has glue 62 on the inner side of its separable outer end 60. When flap 56 is inserted into slot 48 after tear strip 58 has been removed, as shown in FIG. 2, a triangular lip for tray section 38 is formed, with fold line 54 at the apex of the triangle. Notches 64 serve to hold closure flap 56 in position in slot 48, so that the triangular lip is stable. For ease in manufacturing, it may be desirable to simplify the tray lip by eliminating slot 48, and notches 64 and enlarging the size of tear strip 58 so that flap 56 ends at the approximate position of former fold line 54.

FIGS. 2 & 3 show insect killing device 100 which has been assembled from blank 10 which has been shown and described under the discussion of FIG. 1. FIG. 2 shows the device partially assembled for use; FIG. 3, completely assembled. In FIGS. 2 and 3, grille section 30 has been folded in half along fold line 32, aligning openings 34. Doubled-over grille section 30, held together by unshown glue on the inner surfaces of grille section 30, has then been folded against central section 20 (not visible) along fold line 24, and unshown glue holds doubled-over grille section 30 against central section 20 so that doubled-over grille section 30 covers central section 20 and openings 34 to expose the bait 22 and allow it to be accessed by flying insects.

Attachment tabs 46 (not visible in FIGS. 2 and 3) have been glued to the back of central section 20, thereby folding tray 38 up along fold line 26 to a position perpendicular to the grille/central section assembly 20/30 Tray section 38 is held in this position by hinges 42. After use, tray section 38 may be folded up against the grille/central section assembly 20/30, effectively packaging the dead insects for disposal. The end of closure attachment flap 56 has been folded into slot 48 creating the lip, as is shown in FIG. 2.

FIG. 4 shows the device of FIGS. 2 & 3 fully folded upon itself. Blank 10 has been folded upon itself, as described in the discussion of FIG. 1. Hinges 42 have been folded along fold lines 44, bringing tray 38 up against the grille/central section assembly (not visible in FIG. 4). Closure flap 52 has been brought over the top the grille/bait portion and folded along line 50 (not visible). Closure attachment flap 56 is secured to the back of central portion 20 by glue 62 (not visible on FIG. 4) on the back surface of separable outer end 60 of closure attachment flap 56. Extending across the width of closure attachment flap 56 is tear strip 58. As FIG. 4 shows, two sided tapes or other adhesive substance 66 may be attached to the back of attachment flaps 46, so that device 100 may be attached by the user to a wall or other surface, after device 100 has been opened and assembled by the user to the configuration shown in FIG. 3.

Color, metallic flakes, fragrances or other aspects or additions which have been found to attract insects may be added to any portion of the device.

As will be apparent to one skilled in the art, various modifications can be made within the scope of the aforesaid description. Such modifications which are within the ability of one skilled in the art form a part of the present invention and are embraced by the claims.

What is claimed is:

1. A blank for fabricating a device for holding an insect-attracting bait for killing flying insects comprising:

an essentially rectangular blank having a central section extending laterally across the width of the blank and bounded at its upper and lower edges by first and second fold lines extending laterally across the width of the blank respectively, said central section being coated on one side with an insect-attracting bait, and, adjacent said central section on the upper side thereof and separated therefrom by said first fold line extending across the width of the blank, a grille section having at least one opening therethrough, said grille section being essentially double the width of the central section and being bisected laterally into equal and identical parts by a third fold line so that when the two segments of the grille section are folded upon each other, the opening locations are superimposed, and so that a further folding along said first fold line separating the grille section from the central section serves to position the doubled over grille section against the central section, and, adjacent said central section on the lower side thereof and separated therefrom by said second fold line, a tray section extending across the width of the blank:

means for supporting said tray section in a configuration essentially perpendicular to said central section:

means for closing the blank, after the grille and tray sections have been folded against the central section, into an envelope-like unit.

2. A blank according to claim 1, said means for supporting said tray further comprising two hinge flaps on opposite sides of said tray, said hinge flaps being essentially right angle triangles having one leg of the right triangle extending perpendicularly outward from said blank, each flap having a hinged glue-bearing attachment tab extending upwardly from said perpendicular line and each flap having its right angle bisected by a central fold line, so that when said attachment tabs are attached to the backside of the central section, the tray can be folded against the assembled grille/central section of the device by the inward folding of the hinge flaps along their respective central fold lines.

3. A blank according to claim 1, said means for closing comprising a closure flap which is a flat essentially rectangular flap separated from the tray section by two parallel scored fold lines, said fold lines being separated by a distance equivalent to the width of the folded blank and having a tear strip with glue across one surface thereof such that when the blank has been multiply folded, the grille section is folded against the central section and the tray section folded up against the grille/central section, said closure flap can be folded up and over the entire folded blank and closure assured by the glue of the tear strip somewhat in the manner of sealing an envelope, and when said folded device is opened up by removal of the tear strip said tray is lowered to a position perpendicular to the qrille/central section assembly and the end of the closure flap is folded along the scorelines separating the tray section from the closure flap and the end of the closure flap is inserted into a slot running laterally through the tray across the width of the blank to create a lip for a said tray section.

4. A blank according to claim 1 in which the insect-attracting bait includes an insecticide.

5. A blank according to claim 1 further comprising a sticky adhesive substance which coats the top surface of the tray section, such adhesive serving the retain the bodies of dead and dying insects.

6. A blank according to claim 1 further comprising mounting means for attaching the device assembled from said blank to a wall or other surface.

7. A blank according to claim 6 said mounting means further comprising at least one area of adhesive.

8. A device for killing flying insects fabricated from a single essentially rectangular blank, said blank having a central section extending laterally across the width of the blank, and bounded at its upper and lower edges by first and second fold lines extending laterally across the width of the blank respectively, said central section being coated on one side with an insect-attracting bait, and, adjacent said central section on the upper side thereof and separated therefrom by said first fold line extending across the width of the blank, a grille section having at least one opening therethrough, said grille section being essentially double the width of the central section and being bisected laterally into equal and identical parts by a third fold line so that when the two segments of the grille section are folded upon each other, the opening locations are superimposed, and so that a further folding along said first fold line separating the grille section from the central section serves to position the doubled-over grille section against the central section, and, adjacent said central section on the lower side thereof and separated therefrom by said second fold line, a tray section extending across the width of the blank:

means for supporting said tray section in a configuration essentially perpendicular to said central section:

means for closing the blank, after the grille and tray sections have been folded against the central section, into an envelope-like unit.

9. A device according to claim 7 in which the insect-attracting bait includes an insecticide.

10. A device according to claim 7, said means for supporting said tray further comprising two hinge flaps on opposite sides of said tray, said hinge flaps being essentially right angle triangles having one leg of the right triangle extending perpendicularly outward from said blank, each flap having a hinged glue-bearing attachment tab extending upwardly from said perpendicular line and each tab flap having its right angle bisected by a central scored fold line, so that when said attachment tabs are attached to the backside of the central section, the tray can be folded against the assembled grille/central section of the device by the inward folding of the hinge flaps along their respective central scorelines.

11. A device according to claim 7, said means for closing comprising a closure flap which is a flat essentially rectangular flap separated from the tray section by two parallel scored fold lines, said fold lines being separated by a distance equivalent to the width of the folded blank and having a tear strip with glue across one surface thereof such that when the blank has been multiply folded, the grille section is folded against the central section and the tray section folded up against the grille/central section, said closure flap can be folded up and over the entire folded blank and closure assured by the glue of the tear strip somewhat in the manner of sealing an envelope, and when said folded device is opened up by removal of the tear strip, said tray is lowered to a position perpendicular to the grille/central section assembly and the end of the closure flap is folded along the scorelines separating the tray section from the closure flap and the end of the closure flap is inserted into a slot running laterally through the tray across the width of the blank to create a lip for said tray.

12. A device according to claim 7 further comprising a sticky adhesive substance which coats the top surface of the tray section, such adhesive serving to retain the bodies of dead or dying insects.

13. A device according to claim 7, further comprising mounting means for attaching the device assembled from said blank to a wall or other surface.

14. A device according to claim 12, said mounting means further comprising at least one area of adhesive.

* * * * *

UNITED STATES PATENT AND TRADEMARK OFFICE
CERTIFICATE OF CORRECTION

PATENT NO. : 4,959,924

DATED : October 2, 1990

INVENTOR(S) : John Martin

It is certified that error appears in the above-identified patent and that said Letters Patent is hereby corrected as shown below:

In Claim 2, column 4, line 52, "anqle" should be -- angle -- .

In Claim 3, column 5, line 8, "qrille" should be -- grille-- .

In Claim 5, column 5, line 19, (second occur) "the" should be --to--.

In Claims 9, 10, 11, 12, and 13 in column 6, the dependency should be changed from "7" to -- 8 -- .

In Claim 14, column 6, the dependency should be changed from "12" to -- 13 -- .

Signed and Sealed this

Twenty-eighth Day of April, 1992

Attest:

HARRY F. MANBECK, JR.

*Attesting Officer*      *Commissioner of Patents and Trademarks*